United States Patent [19]

Hammond et al.

[11] Patent Number: 5,016,968
[45] Date of Patent: May 21, 1991

[54] DUPLEX OPTICAL FIBER CONNECTOR AND CABLES TERMINATED THEREWITH

[75] Inventors: Rodney W. Hammond, Norcross; Clyde J. Myers, Stone Mountain; Ruben Travieso, Alpharetta, all of Ga.

[73] Assignee: AT&T Bell Laboratories, Murray Hill, N.J.

[21] Appl. No.: 413,501

[22] Filed: Sep. 27, 1989

[51] Int. Cl.$^5$ .............................................. G02B 6/36
[52] U.S. Cl. .................................................. 350/96.20
[58] Field of Search ......................... 350/96.20–96.22

[56] References Cited

U.S. PATENT DOCUMENTS

| | | | |
|---|---|---|---|
| 4,047,797 | 9/1977 | Arnold et al. | 350/96.21 |
| 4,233,724 | 11/1980 | Bowen et al. | 29/428 |
| 4,611,887 | 9/1986 | Glover et al. | 350/96.21 |
| 4,634,214 | 1/1987 | Cannon, Jr. et al. | 350/96.21 |
| 4,715,675 | 12/1987 | Kevern et al. | 350/96.20 |
| 4,787,706 | 11/1988 | Cannon, Jr. et al. | 350/96.20 |

Primary Examiner—Akm Ullah
Attorney, Agent, or Firm—E. W. Somers

[57] ABSTRACT

A connector (20) for terminating a duplex cable jumper cable (23) which is used for making interconnections in administrative locations of an FDDI system includes a plastic housing (21) having a jumper input end (26) and a connection end (28). Each fiber (25) of the jumper cable is terminated by a ferrule (64) which is supported in the housing and which has a portion that extends from the connection end of the housing. The protruding ends of the ferrules are protected by a shroud (130) which is removably attached to the connection end of the housing. Inasmuch as the shroud is removable, the end portions of the ferrules may be accessed for cleaning. Advantageously, the shroud may be provided with a keyway (157) to facilitate the mating of a connector with a key arrangement (159) in a receptacle (125) into which the connector is to be inserted. Different shrouds may be attached to the housing to facilitate the insertion of the connector into a desired receptacle.

19 Claims, 5 Drawing Sheets

DUPLEX OPTICAL FIBER CONNECTOR AND CABLES TERMINATED THEREWITH

TECHNICAL FIELD

This invention relates to a duplex optical fiber connector and cables terminated therewith. More particularly, it relates to an optical fiber connector which is suitable for use with network systems such as one for local area networks.

BACKGROUND OF THE INVENTION

The data communications industry has established the fiber distributed data interface (FDDI) as a standard for the definition of the properties of a local area network. A system in accordance with that standard is referred to as an FDDI system and is an optical system port to port operating at a data line rate of 125 megabits per second.

FDDI is the first, all optical fiber high speed local area network system and will become prominent in the last decade of the twentieth century. It will provide a high speed optical transmission path between mainframe and peripheral equipment and is suitable for use as a backbone network between lower speed local area networks. FDDI presently is a 100 megabit LAN transfer data rate system that recommends a 62.5/125 micron core/cladding diameter optical fiber and is an LED based standard involving dual, counter-rotating, token passing rings that operate at a center wavelength of 1300 nm.

Dual rings include a primary ring and a secondary ring. Dual rings are used to provide enhanced reliability and an option for higher performance. If both rings are operative, the capability of transmitting in both ring directions exists.

The large scale use of optical fiber for the local area network will result in an extensive use of optical fiber in building distribution systems. The FDDI system presents several challenges. There are restrictions imposed by FDDI standards and there are complications associated with large quantities of fiber that include fiber which extends to individual work stations.

In order to aide network engineers and installers in enforcing basic rules and/or more restrictive policies which may be chosen by the user, the FDDI standard has defined certain requirements. For example, details of a receptacle for a dual fiber connector are specified in a standard referred to as the Physical Layer Medium Dependent (PMD) part of the FDDI standard. The PMD determines the specifications for optical transmitters and receivers, optical fiber, optical connections and optical bypass switches along with optional keying configurations. The receptacle and an associated plug are polarized mechanically to prevent the transposition of transmit/receive fibers, and keys corresponding to station interfaces are designed to avoid mixing primary and secondary rings and to avoid mixing station attachments. Viewing a station with the key on top, the transmit signal always exits the interface on a left fiber port, and the receive signal always enters the interface on a right fiber port.

A simple dual ring architecture can be arranged with the keying and signal directions defined in the PMD standard by using duplex jumper cables. The primary ring is constructed by connecting a B receptacle of each station to an A receptacle of the next station in a forward direction around the primary ring. When the primary ring is closed, the secondary ring is completed with the secondary ring signal flowing in an opposite direction.

As the network expands to multiple floors of a single building or to a campus including multiple buildings, connections become prohibitively complex to administer. For such expanded networks, it should be clear that a manageable distribution system is necessary. A sought-after system which includes simplistic rules for installation and administration of jumper cables is disclosed in application Ser. No. 401,354 which was filed on Aug. 31, 1989 in the names of R. M. Kimball and T. McIntosh.

Connectors must be provided to terminate jumper cables each of which includes two optical fibers. It is these jumper cables which are used in administrative locations such as in an equipment room and in riser and satellite closets to make cross-connections between interfaces in which cable runs terminate. The connectors are duplex connectors each being capable of terminating two optical fibers.

The FDDI connector typically comprises two plugs or ferrules, as they usually are called, each of which terminates an optical fiber. The two ferrules are mounted in a housing which has an entry end for a duplex cable. Each of the ferrules is spring-loaded to allow the connection between two ferrules to be loaded.

Duplex connectors for optical fiber are known in the art. For example, see U.S. Pat. No. 4,787,706 which issued on Nov. 29, 1988 in the names of T. C. Cannon, Jr., A. W. Carlisle and B. V. Darden. That connector includes a housing in which are mounted two ferrules. Each of the ferrules which terminates an optical fiber extends from an end of the housing opposite to that end into which a cable enters. The protruding ends of the ferrules are protected by a retractable bumper or shroud which may be moved rearwardly toward the opposite end of the housing to expose the ferrule ends and facilitate optical connections to other ferrules. Although the connector which is disclosed in the above-identified T. C. Cannon, et al. patent is suitable for duplex connections, FDDI standards are such that any shroud which covers the exposed ends of the ferrules invariably must be fixed in position.

The ferrules in such a connector have a propensity for becoming contaminated with dust, for example. Such contamination can affect adversely the performance characteristics across the connection. Accordingly, it is desired to be able to access the ferrules so that they may be cleaned from time to time.

Also of interest in the FDDI system is the ability to key different connectors for purposes of installation and administration. This has been accomplished with an arrangement such as, for example, that in the duplex connector disclosed in the above-identified Cannon et al. patent.

What is needed and what seemingly is not disclosed in the art is a connector for use with the FDDI which is relatively easy to manufacture. The sought-after connector should have provisions for protecting extending end portions of fiber terminating ferrules as well as allowing the end portions of the ferrules to be cleaned. Further, it is desired that the sought-after connector include keying provisions to simplify installation and administration of the connector in a network system.

SUMMARY OF THE INVENTION

The foregoing problems of the prior art have been overcome with the optical fiber connector of this invention. A duplex optical fiber connector for terminating two optical fibers of a cable and being adapted to be joined to another connector comprises a housing which comprises first and second mating portions and which includes a cable entrance end and a free end. A connector plug assembly adapted to be associated with each of the optical fibers is disposed within the housing adjacent to the free end of the housing. Each plug assembly includes a ferrule being adapted to be associated with and to terminate one of the optical fibers of the cable and protruding from the free end of said housing. A protective shroud is fixed to and removably mounted on the housing in which the plug assemblies are disposed for protecting end portions of the ferrules which protrude from the housing.

The shroud provides the connector with several capabilities. Firstly, the shroud may be removed to expose the ferrules and allow them to be cleaned. Secondly, the shroud may be keyed to a particular receptacle in which the connector is to be assembled in order to effect optical connections. In order to facilitate connection to a different receptacle, the shroud may be replaced with another which has a different keying arrangement suited to facilitate connection to the other receptacle.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
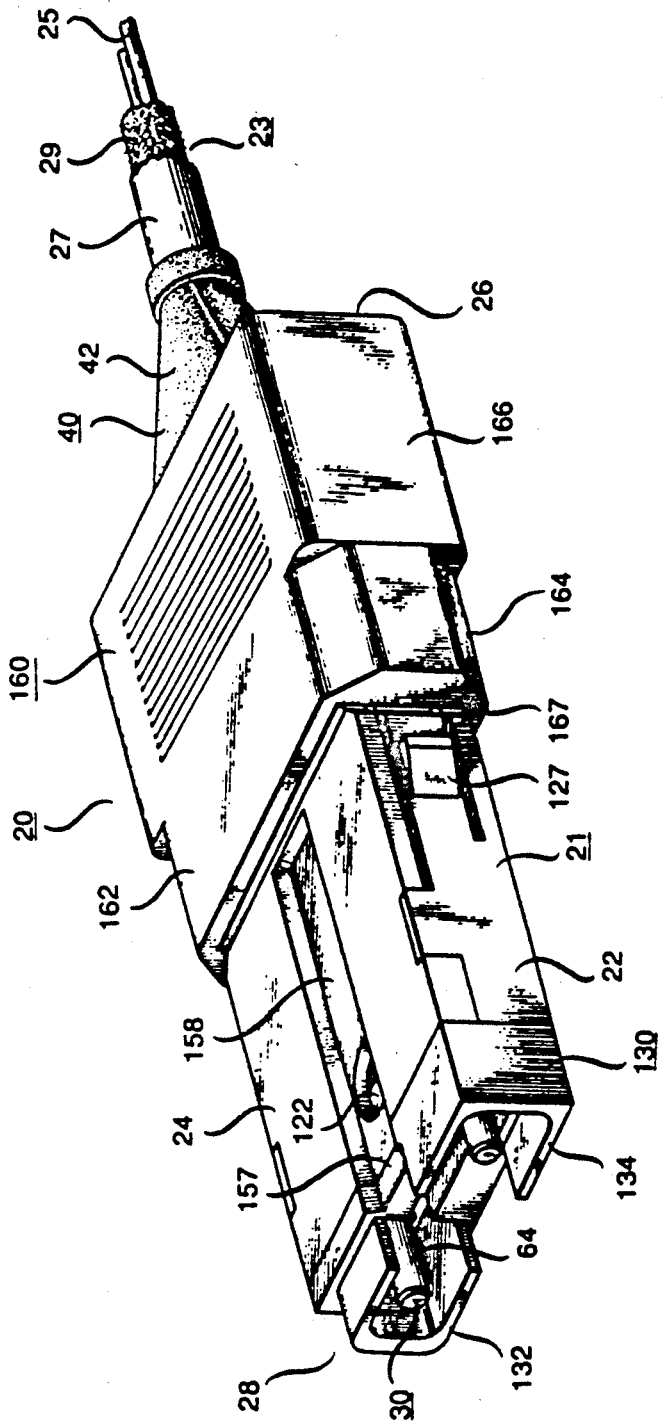
FIG. 1 is a perspective view of an optical fiber connector of this invention which includes a removable shroud.
Figure 2:
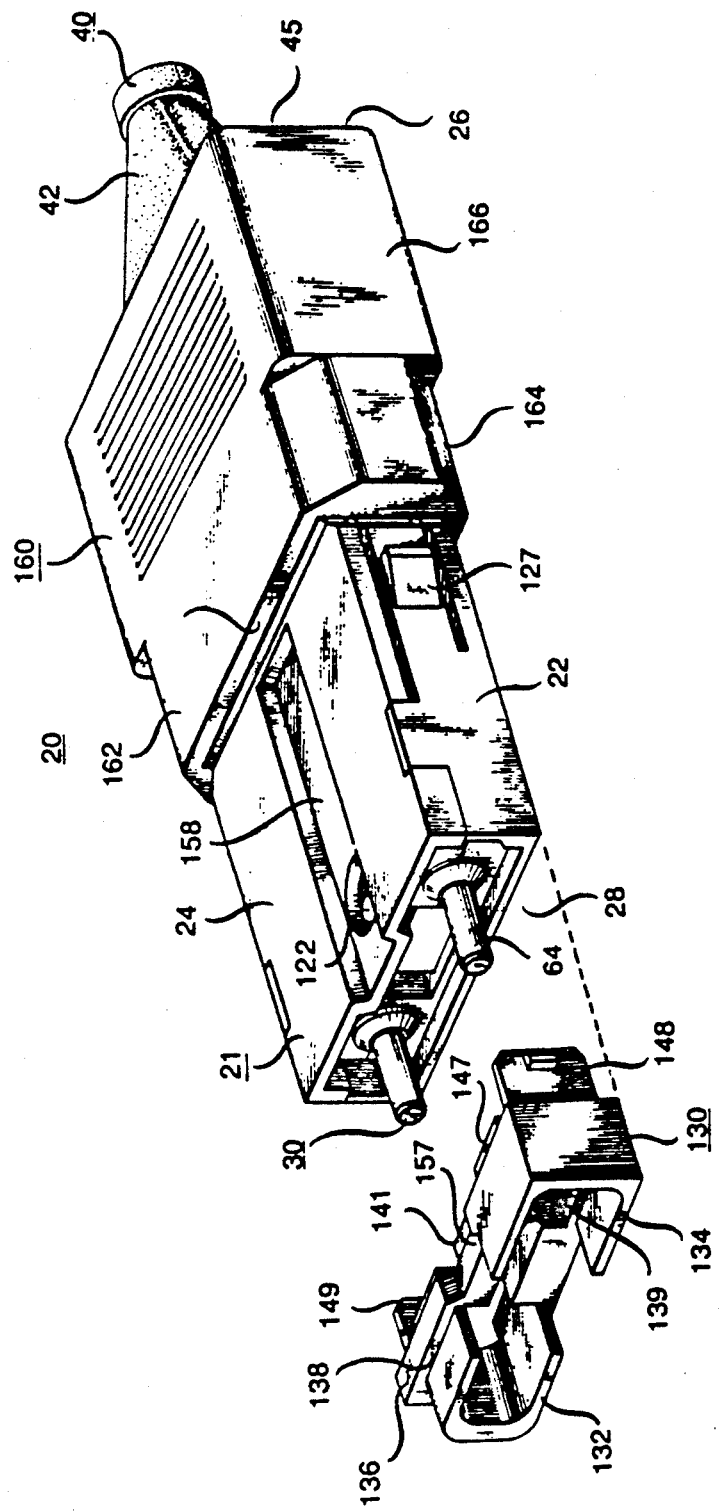
FIG. 2 is a perspective view of the connector of FIG. 1 having a shroud removed from a housing thereof.

Referring now to FIGS. 1 and 2, there is shown a duplex optical fiber connector which is designated generally by the numeral 20. The duplex connector 20 includes a housing 21 having a base 22 and a cover 24 which is adapted to hold two devices which terminate optical fibers of a cable 23. Typically, the cable 23 includes two buffered optical fibers 25—25 each of which includes an optical fiber enclosed in a coating and a buffer layer of a plastic material such as polyvinyl chloride (PVC). The buffered optical fibers 25—25 are enclosed in a common plastic jacket 27 and a non-metallic strength member system comprising yarn 29 disposed between the optical fibers and the jacket (see FIG. 1). The housing 21 is made of a rigid plastic material and includes a cable entry end 26 into which the cable 23 extends and a connection or free end 28.

The base 22 includes two nests 31—31 (see FIG. 3), each adapted to receive an end portion of a connector plug assembly 30 (see FIG. 1). Each nest 31 is defined by a side wall 32 of the base and by an internally disposed wall 34 each wall having an inturned portion 35. The internally disposed walls 34—34 which define the nests are spaced apart by an abutment 36. Further, each of the walls 32—32 and 34—34 includes a slot 37 oriented toward the cable entry end of the base. The slots 37—37 of the walls 32 and 34 which form each nest 31 face each other.

Figure 4:
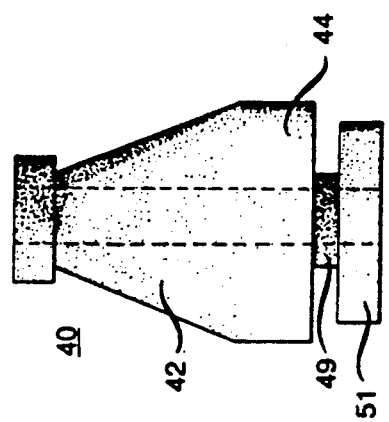
FIG. 4 is a detail view of a cable strain relief portion of the connector.
Figure 3:
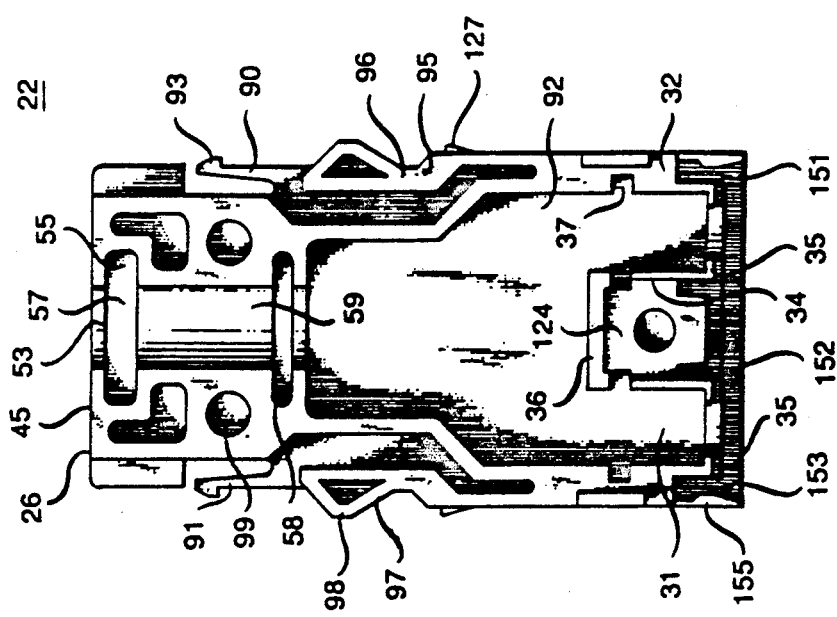
FIG. 3 is a plan view of a base of the connector housing as viewed from the inside.

Viewing now FIG. 3, it can be seen that the cable entry end of the base 22 includes provisions for securing a strain relief boot 40 (see FIG. 1) which is secured to an end portion of the cable 23. The boot 40 includes a portion 42 (see also FIG. 4) which tapers from the outer diameter of the cable 23 to a widened portion 44 which abuts an outer surface 45 of the cable entry end 26 of the base 22. A necked-down portion 49 of the boot 40 connects the widened portion 44 to a flange 51. The flange 51 is received in a slotted portion 53 of the base 22 comprising two side portions 55—55 and a bottom portion 57.

When the end portion of the cable 23 is provided with the boot 40 and the boot is secured in the base 22 by the cover 24, an end portion of the cable 23 extends through a semi-circular channel 59. The end portion of the cable 23 further is secured within the base 22 by a collar (not shown) which is disposed about the end portion of the jacket of the cable and which is received in a slotted opening 58 adjacent to one end of the channel 59.

Figure 5:
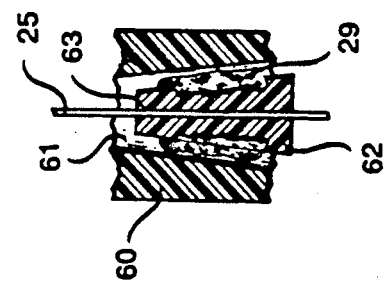
FIG. 5 is a detail view of a force transfer system at a cable entry end of the connector.

Adapted to be received in the semicircular channel 59 (see FIG. 3) adjacent to the cable entry end 26 of the base 22 is a flanged sleeve 60 having a tapered opening 61 therethrough (see also FIG. 5). The larger diameter end of the opening 61 is oriented toward the free end of the housing. A tapered plug 62 having a passageway 63 therethrough is adapted to become disposed within the opening 61 in the sleeve. When a jumper cable 23 is brought through the boot 40 into the cable entry end 26 of the housing 21, the jacket 27 is removed to expose the yarn-like strength members 29—29. The buffered optical fibers 25—25 are routed through the passageway 63 of the plug and the yarn-like strength members 29—29 caused to become disposed between the plug and the inner wall of the sleeve. When the plug 62 is urged into seating engagement with the sleeve 60, this yarn-like strength members 29—29 are clamped between the plug and the sleeve. In use, any forces applied to the cable are transferred through the yarn to the sleeve and connector housing thereby avoiding any undue forces being applied to the optical connection.

From the jacketed end portion of the cable 23 extend end portions of the buffered optical fibers 25—25. Each of the end portions of the buffered optical fibers 25—25 is terminated by a connector plug assembly which is designated generally by the numeral 30. (see FIGS. 6 and 7).

Figure 6:
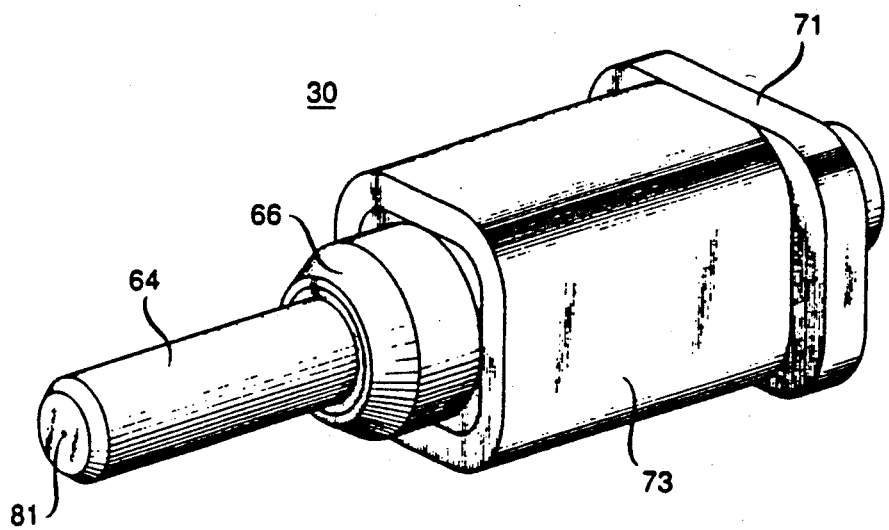
FIG. 6 is a perspective view of a connector plug assembly.
Figure 7:
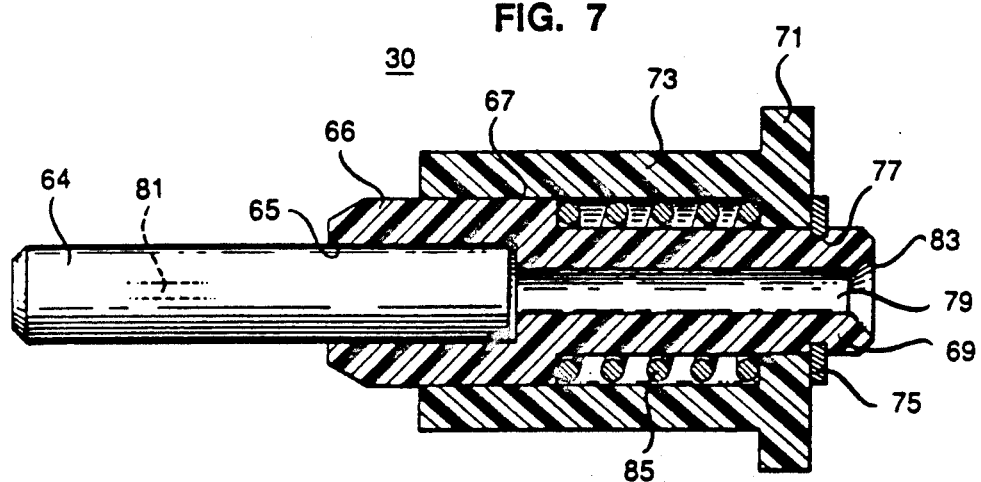
FIG. 7 is a side elevational view in section of the connector plug assembly of FIG. 6.

As can be seen in FIGS. 6 and 7, each of the connector plug assemblies 30—30 includes a plug or ferrule 64 which is cylindrically shaped and which has an end portion received in a bore 65 formed in an enlarged portion 66 of a barrel 67. A smaller diameter portion 69 of the barrel 67 extends beyond a flange 71 of a housing 73. The barrel 67 is held within the housing 73 by a clip 75 which is received in a circumferential groove 77 formed in an outer portion of the small diameter portion 69. The small diameter portion 69 of the barrel 67 is provided with a bore 79 which at one of its ends communicates with a bore 81 of the ferrule 64. Further, an opposite end of the bore 79 adjacent to the flange 71 is provided with a flared entrance 83 to facilitate insertion of an optical fiber to be terminated by the plug 64. A spring 85 is disposed concentrically about the small diameter portion 69 of the barrel 67 between the barrel and an inner wall of the housing 73. With the plug assemblies 30—30 supported in the base 22, end portions of the ferrules 64—64 extend beyond the free end of the housing. Also with the connector plug assembly 30 supported in the nest in the base 22, forces applied to an end of the ferrule cause the barrel 67 to be moved toward the center of the housing, compressing the spring 85 and causing the clip 75 to become spaced from the flange 71.

Also as can be seen in FIG. 7, the diameter of the bore 79 is substantially larger than that of the passageway 81 in the ferrule 64. To terminate a buffered optical fiber, the plastic buffering material and the coating or coatings are removed from an end portion thereof. The end portion of the buffered optical fiber from which the plastic buffering and the coating material have been removed is inserted into the passageway 81 of the ferrule 64 whereupon the portion from which the plastic buffering material has not been removed becomes disposed in the larger bore 79.

Returning now to FIG. 3, it can be seen that the base 22 is provided with a pair of primary resilient latches 90—90 adjacent to the cable entry end thereof and to a bottom portion 92 thereof. Each of the latches 90—90 includes an arm 91 which is attached to the base and a hook-like end 93 which is attached to a free end thereof.

Also provided in the base 22 are a pair of release portion 95—95, one on each side of the base. Each release portion 95 is adjacent to the open side of the base 22. Further, each release portion 95 includes an arm 96 which is cantilevered from a portion of the base somewhat adjacent to the free end thereof. Adjacent to a free end of the arm is a camming portion 97 which ramps outwardly toward a peak 98 and then downwardly to the free unsupported end of the arm.

Further included in the base 22 are a plurality of threaded wells 99—99. The wells 99—99 are used to facilitate the assembly of the cover 24 to the base 22. Of course, the cover could be secured to the base 22 in other ways such as for example, by ultrasonic bonding.

Figure 8:
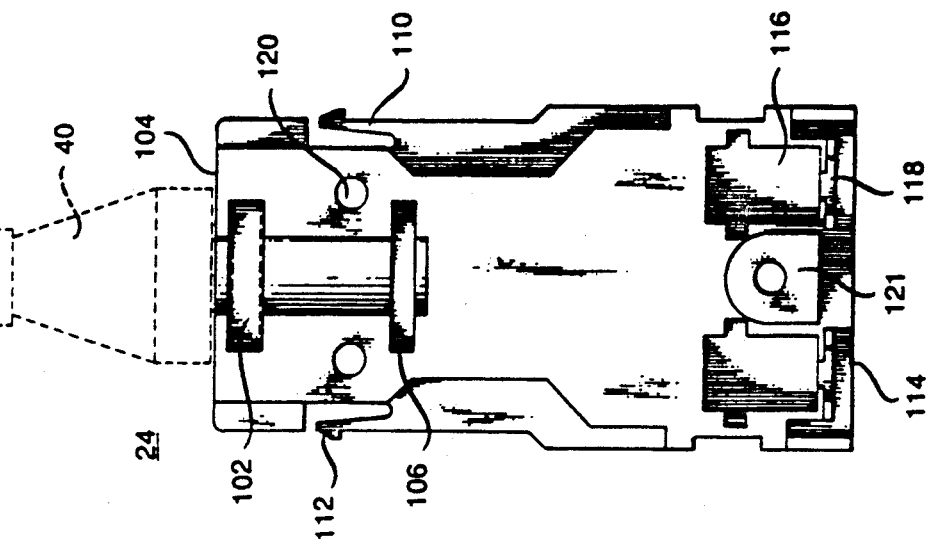
FIG. 8 is a plan view of a cover of the housing as viewed from the inside.

As can be seen in FIG. 8, the cover 24 is provided with a groove 102 adjacent to an end 104 thereof which becomes disposed adjacent to the cable input end of the base. When the cover is assembled to the base 22, an edge portion of the flange 51 of the boot 40 is received in the groove 102. Further, the cover is provided with another groove 106 in which is received a portion of the flange of the sleeve 60 which is disposed about an end portion of the jacketed cable.

The cover 24 also includes latching provisions which cooperate with latching provisions of the base 22 when the cover is assembled to the base to hold the housing within an enclosing portion referred to as a release hood. As can be seen in FIG. 8, the cover 24 includes a pair of latching arms 110—110 which are attached to opposite sides of the cover. Each arm 110 includes a latching portion 112 depending from a free end thereof.

Adjacent to an end 114 of the cover which becomes disposed adjacent to the free end of the housing when the cover is assembled to the base are formed two recesses 116—116. The recesses 116—116 which are formed in an underside of the cover are adapted to receive exposed portions of the plug assemblies 30—30 which are supported in the base 22. Outer ends of the recesses 116—116 have collar portions 118—118 which are adapted to become disposed about portions of the barrels 66—66 which project from the housing portions 73—73 of the plug assemblies.

In order to facilitate the assembly of the cover 24 with the base 22, the cover is provided with three openings 120—120. When the cover becomes engaged with the base, the openings 120—120 becomes aligned with the threaded wells 99—99 in the base. This allows fasteners 122—122 (see FIG. 1) to be turned through the openings 120—120 into the wells to secure together the base and the cover.

Also, as can be seen in FIG. 8, the cover 24 includes a protruding boss 121. When the cover 24 is assembled to the base 22, the boss 121 is received in a mating cavity 124 formed in the abutment 36 (see FIG. 3).

Figure 9:
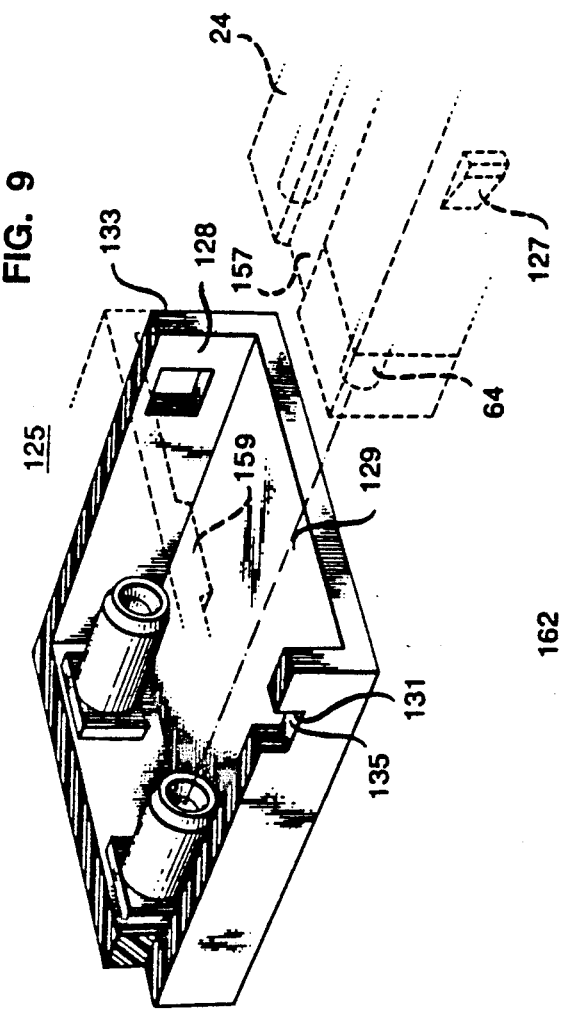
FIG. 9 is a perspective view of a receptacle into which the connector of FIG. 1 may be inserted.

The connector 20 is adapted to provide for optical connections of the two optical fibers which are terminated by the ferrules 64—64 to two other optical communications paths. The other two optical connections paths may be comprised of two ferrules in another duplex connector which terminate two optical fibers or they may be two optical paths in a device such as an electro-optical device, for example. Such a connection is generally made through a receptacle 125 (see FIG. 9) which is adapted to receive two duplex connectors 20—20 in opposite ends thereof or to receive a duplex connector 20 in one end and a device in an opposite end. Also, the receptacle may be used to couple together a duplex connector 20 and two simplex, single fiber connectors (not shown).

When the free end of a duplex connector 20 is inserted into a receptacle 125, latches 127—127 (see FIG. 3) which are provided on the outwardly facing surfaces of the arms 96—96 of the release portions 95—95 cam against guide surfaces 128—128 which define an opening 129 for receiving the duplex connector free end. Because the arms 95—95 are cantilevered and are capable of being deflected, the insertion of the free end of the duplex connector into a receptacle causes forces to be applied to the arm to cause the arms to be deflected. As the duplex connector 20 reaches the desired limit of insertion travel, the latches 127—127 ride past a step 131 in side walls 133—133. This allows the arms 95—95 to return outwardly to their normal position relative to the base 22 and causes the latches 127—127 to spring into a locking position within openings 135—135. As a result, the connector 20 becomes secured with the receptacle against unintended axial movement.

Figure 10:
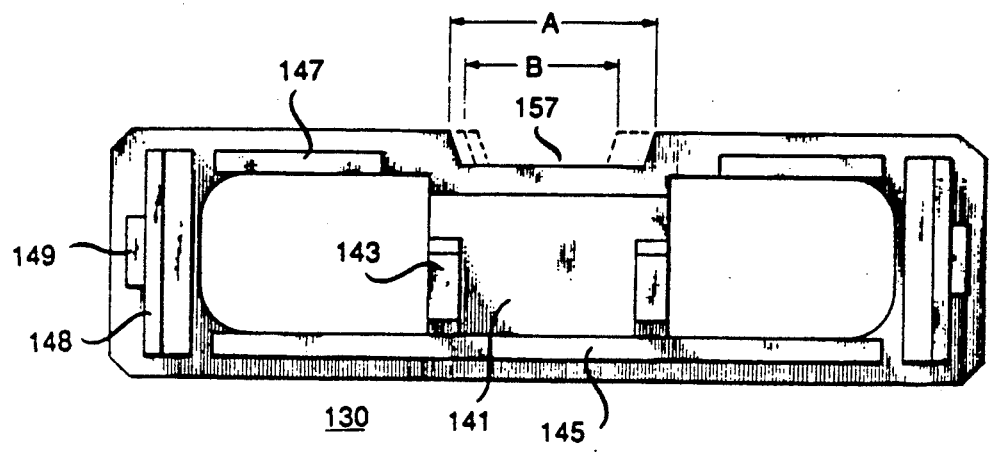
FIG. 10 is an end view of the removable shroud.

Adapted to be attached to the free end of the connector 20 is a shroud 130 (see FIGS. 1-2 and 10). The shroud to be removed to permit access to the terminating ferrules 64—64. This allows the ferrules 64—64 to be cleaned and at the same time allows the housing 21 to meet FDDI standards. Advantageously, not only does the removable shroud facilitate cleaning, it also provides the connector 20 with the capability of being keyed to mate with a particular receptacle.

The shroud 130 comprises two covering portions 132 and 134 each of which encloses its associated ferrule on three sides with the fourth side of each being open. As is seen, the open sides of the covering portions 132 and 134 face each other. Also as can be seen, the covering portion 134 is larger than the covering portion 132. The covering portion 132 extends from a center body portion 136 in a manner to provide a lip 138 about the exterior of that covering portion. On the other hand, the covering portion 134 extends from the center body portion 136 in a manner which forms a step 139 interiorly of that covering portion. Extending rearwardly from the center portion 136 is a centrally disposed locator 141 having two spaced locator tabs 143—143 extending therefrom. A continuous ridge 145 extends from the center portion 136 contiguous to one side of the locator 141. Two spaced fins 147—147 project parallel to the ridge 145 with one being on either side of the locator 141.

The shroud 130 also includes provisions for being secured to the assembly of the base and the cover. Cantilevered from the center portion 136 adjacent each end thereof is a deflectable tab 148 having a latching nub 149 at a free end thereof.

In order to facilitate the assembly of the shroud 130 to the base 22 and the cover 24, the locator 141 of the shroud is formed to be contiguous to the ridge 145 but spaced from the two spaced fins 147—147. During assembly of the shroud 130 to the assembled base and the cover, the shroud is positioned to cause the locator 141 to become disposed adjacent to the base 22 of the housing. Further, the shroud 130 is aligned with the housing to cause the locator tabs 143—143 to become aligned with locator slots 152—152 (see FIG. 3), which are formed on opposite sides of the center abutment 36 adjacent to the free end of the base 22. Again viewing FIG. 3, it can be seen that the housing 21 is formed to provide facilities for receiving the deflectable tabs 148—148. Between each nest 31 which receives a connector plug assembly 30 and a sidewall 32 is formed a socket 151 which includes a ramp portion 153. As the shroud 130 is assembled to the housing 21, the deflectable tabs 148—148 are moved into the sockets 151—151. The latching nubs 149—149 ride along the camming portions 153—153 and snap-lock behind surfaces 155—155 thereof to secure the shroud to the housing end cover. The surfaces 155—155 are inclined sufficiently to retain the latching nubs 149—149 but are such that upon the application of forces of a predetermined magnitude, the shroud may be separated from the housing 21.

Should the shroud 130 be inverted from its correct orientation for assembly to the housing 21, the leading ends of the tabs 143—143 will engage the boss 121 of the cover 24 before the deflectable tabs 148—148 are seated fully within the sockets 151—151. This signifies to a craftsperson that the orientation is incorrect and that an adjustment is necessary.

The connector 20 includes provisions for insuring proper orientation of the connector upon insertion into the receptacle 125 and for insuring that the correct connector is being inserted into a particular receptacle. As for the correct orientation, the difference in size of the two covering portions 132 and 134 and the difference in size of two side by side receiving openings of the receptacle insures proper orientation of one duplex connector with another duplex connector. In other words, for coupling two duplex connectors, the shroud is a means of polarization for the connector.

General provisions for insuring that the desired connector is being inserted into a receptacle includes the size and position of a keyway 157 (see FIGS. 1-2 and 10) between the two covering portions of the shroud 130. The receptacle 125 into which is received the connector 20 is provided with a key 159 (see FIG. 9) which is adapted to be received in a keyway of conforming size. It also should be observed that an extension 158 (see FIG. 1) of the keyway is formed along a portion of the cover 24. The width of the keyway extension 158 which is designated "A" in FIG. 10 does not vary. The size of the keyway 157 may be narrowed and/or offset from the keyway extension 158 by causing the top and bottom portions of one or both of the covering portions to extend closer to the centerline of the shroud (see dimension "B" in FIG. 10). Instead a connector 20 is keyed for a particular receptacle by fitting it with a shroud which includes a keyway 157 of suitable size. Such provisions are effective not only when coupling two duplex connectors, but also when coupling a duplex connector to an optical device or to two simplex connectors, for example.

Figure 11:
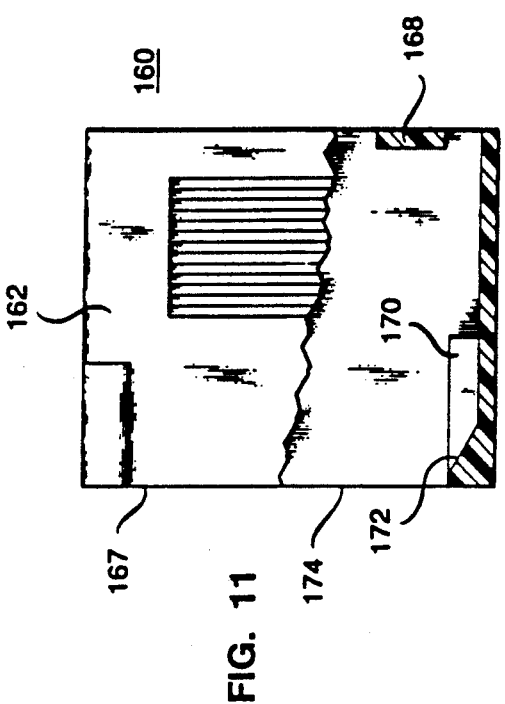
FIG. 11 is a plan view in section of a release hood which is mounted slidably on the assembly of the base and the cover.

The connector also must include provisions for decoupling the connector from a receptacle 125. Such provisions include a release hood 160 which is best seen by viewing FIGS. 1-2 and 11. The hood 160 includes a top 162 and a bottom 164 and two side walls 166—166. A front end 167 of the hood 160 includes an opening adapted to receive the cable input end of the connector. An opposite or back end of the hood 160 includes two spaced straps 168—168 between which is adapted to become disposed the boot 40 disposed about an end jacketed portion of the cable. The cable extends between the two straps out of the hood 160.

Formed along an inner surface of each side wall 166 at its intersection with the top or the bottom is a rail 170. The rail extends about half the distance from one end to an opposite end of the hood 160. Between the two rails 170—170 along each side wall 166 is a ramp 172 which is inclined from the sidewall to an entry opening 174 of the hood.

The hood 160 is assembled to the covered connector housing by causing the cable 23 and the boot 40 to extend between the straps 168—168 and the front portion of the hood to become disposed over the cable entry end of the housing until the hook-like ends 93—93 and the latching portions 112—112 of the arms 91—91 and 110—110, respectively, snap-lock behind the ends of the rails 170—170. At that time the triangular shaped camming portions 97—97 of the arms 96—96 of the base are disposed between the rails 170—170 and spaced from the ramp 172. It should be noted that the latching of the hook-like ends 93—93 and the latching portions 112—112 behind the rails 170—170 is such that they may become disengaged upon the application of suitable forces to disassemble the housing 21 from the hood 160.

As mentioned hereinbefore, when a connector 20 is inserted into a receptacle, the latches 127—127 of the arms 96—96 snap-lock behind steps within the receptacle. In order to release the latches to allow withdrawal of the connector from the receptacle, the hood 160 is moved rearwardly in a direction from the free end toward the cable entry end. This movement causes the triangular shaped camming portions 97—97 to cam against the ramps 172—172 deflecting the arms 96—96 inwardly toward the sidewalls of the housing. The deflection of the arms 96—96 causes the latching nubs 127—127 to become disengaged from the openings 135—135 within the receptacle thereby permitting withdrawal of the connector from the receptacle.

It is to be understood that the above-described arrangements are simply illustrative of the invention. Other arrangements may be devised by those skilled in the art which will embody the principles of the invention and fall within the spirit and scope thereof.

We claim:

1. A duplex optical fiber connector for terminating two optical fibers of a cable and being adapted to be connected optically to another connector, said duplex connector comprising:
   a housing which comprises first and second mating portions and which includes a cable entry end and a free end with one of said mating portions including a keyway;
   two plug assemblies disposed within said housing adjacent to said free end of said housing, each said plug assembly including a ferrule being adapted to be associated with and to terminate one of the optical fibers of a cable and having a portion which protrudes from said free end of said housing; and
   protective means being mounted in a fixed position on said free end of said housing for protecting end portions of the ferrules which protrude from said housing and being capable of being removed to expose said end portions of said ferrules, said protective means including a keyway which becomes aligned with said keyway of said housing when said protective means is mounted on said free end of said housing, wherein said housing is capable of having any one of a plurality of protective means having keyways of different cross sectional dimensions mounted thereon to allow said connector to be keyed to a desired receptacle having a mating key formed on an inner wall thereof.

2. The duplex optical fiber connector of claim 1, which also includes force transfer means adapted to be disposed adjacent to said cable entry end and through which the optical fibers extend for transferring forces applied to the cable to said housing.

3. The duplex connector of claim 1, wherein said housing includes a base and a cover, said base of which includes deflectable release portions including latching portions for securing a portion of said connector within a receptacle.

4. The duplex connector of claim 3, which also includes a release hood for receiving a cable entry end portion of said connector, said base and said cover including latching portions for causing said cable entry end portion to become secured against unintentional movement within said release hood.

5. The duplex connector of claim 4, wherein said deflectable release portions of said base each includes a cantilevered arm one being on each side of said base and having a camming portion extending therefrom for cooperating with a ramp portion formed interiorly of said release hood to cause the cantilevered arms to be moved inwardly as said hood is moved toward said cable entry end of said housing whereupon said camming portions cooperate with said ramp portions to deflect said arms inwardly to disengage said latching portions connected to said arms from securing portions within the receptacle.

6. The duplex connector of claim 1, wherein said protective means is such that it is capable of being assembled to said housing only in a desired orientation.

7. The duplex connector of claim 6, wherein said protective means includes a shroud which is snap-locked to said free end of said housing.

8. The duplex connector of claim 7, wherein said housing is provided at the free end thereof with two sockets, each of which is adjacent to a side wall thereof and said shroud includes two latching arms, an end of each of said latching arms of said shroud being adapted to hook behind a retaining step within one of said sockets to secure said shroud to said housing.

9. The duplex connector of claim 8, wherein said housing includes a base and a cover and said base includes a centrally located abutment having a center cavity for receiving a mating boss formed on an inner surface of said cover adjacent to said free end of said housing and said shroud includes a center locator having two locator tabs projecting therefrom and two fins spaced apart, one on each side of said locator, each of said tabs adapted to be received in a locator slot disposed adjacent to said abutment of said base and said fins adapted to be received adjacent to an inner surface of a raised portion of said cover, the raised portions of said cover forming a keyway which extends longitudinally of said cover, said shroud on a side of said center locator opposite to said two spaced fins including a continuous ridge which spans across said locator with said tabs being contiguous to said ridge and extending only partially along the height of said abutment so that should the shroud be misoriented for assembly to said housing, said tabs of said shroud engage said boss of said cover preventing full insertion of said latching arms of said shroud into said sockets.

10. The duplex connector of claim 9, wherein said shroud includes two covering portions, one of which encloses one ferrule and one of which encloses another ferrule, one of said enclosing portions having a width and a height in a plane normal to a longitudinal centerline of said housing which are greater than the width and the height of the other one of the enclosing portions.

11. The optical fiber connector of claim 10, wherein each of said enclosing portions of said shroud project from a center portion, said center portion between said enclosing portions on a side of said shroud which is opposite to that on which said ridge is formed being formed with a keyway which becomes aligned with said keyway in said cover when said shroud is assembled to said housing.

12. The optical fiber connector of claim 11, wherein said shroud is provided with a keyway which is smaller than and offset from the keyway of said cover.

13. The optical fiber connector of claim 1, wherein each said plug assembly includes a ferrule having a longitudinally extending passageway formed therethrough for receiving an end portion of an optical fiber to be terminated by said plug assembly, an end portion of said ferrule adapted to be received in a large diameter portion of a stepped bore of a barrel having an enlarged portion in which is formed said large diameter portion of said stepped bore, said barrel also including a fiber entry portion which extends from said enlarged portion and which includes a passageway formed therethrough and communicating with said passageway in said ferrule, said passageway in said fiber entry portion having a flared entrance to facilitate insertion of the optical fiber.

14. The optical fiber connector of claim 13, wherein said barrel is received in a cavity of a holder, said cavity having a diameter slightly larger than the diameter of said enlarged portion of said barrel, said holder including a flange through which extends said fiber entry portion of said barrel, said plug assembly also including means adjacent to said flange for securing said barrel within said holder, and further said plug assembly also including a compression spring which is disposed concentrically about said fiber entry portion of said barrel between said enlarged portion of said barrel and said flange.

15. A connectorized optical fiber cable, which includes:
   an optical fiber cable which includes two optical fibers; and
   a duplex optical fiber connector for terminating said two optical fibers, said duplex connector comprising:
   a housing which comprises first and second mating portions and which includes a cable entry end and a free end with one of said mating portion including a keyway;
   two plug assemblies disposed within said housing adjacent to said free end of said housing, each said plug assembly including a ferrule being adapted to be associated with and to terminate one of the optical fibers of a cable, and having a portion which protrudes from said free end of said housing; and
   protective means being mounted in a fixed position on said free end of said housing for protecting end portions of the ferrules which protrude from said housing and being capable of being removed to expose said end portions of said ferrules, said protective means including a keyway which becomes aligned with said keyway in said housing when said protective means is mounted on said free end of said housing, wherein said housing is capable of having any one of a plurality of protective means having keyways of different cross sectional dimensions mounted thereon to allow said connector to be keyed to a desired receptacle having a mating key formed on an inner wall thereof.

16. The cable of claim 15, wherein said duplex connector includes force transfer means adapted to be disposed adjacent to said cable entry end and through which the optical fibers extend for transferring forces applied to the cable to said housing.

17. The cable of claim 15, wherein said housing includes a base and a cover and said connector includes a release hood being mounted slidably on said housing and adapted to cause latching portions of said housing which hold said connector in a receptacle to be released to allow withdrawal of said connector from said receptacle.

18. The cable of claim 17, wherein said protective means includes a shroud wherein said shroud includes a keyway which is aligned with a keyway in said cover, said keyways in said shroud and housing being adapted to receive a key of a receptacle into which said connector is inserted.

19. The cable of claim 18, wherein said shroud is provided with a keyway which is smaller than and offset from the keyway of said cover.

* * * * *